(12) United States Patent
El Ferik et al.

(10) Patent No.: US 8,499,617 B2
(45) Date of Patent: Aug. 6, 2013

(54) DUAL SUBMARINE LEAK DETECTION SYSTEM

(75) Inventors: Sami El Ferik, Dhahran (SA); Bilal Ahmed Siddiqui, Dhahran (SA); Rached Ben-Mansour, Dhahran (SA); Fouad M. Al-Sunni, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 280 days.

(21) Appl. No.: 13/026,040

(22) Filed: Feb. 11, 2011

(65) Prior Publication Data

US 2012/0204624 A1    Aug. 16, 2012

(51) Int. Cl.
*G01M 3/00*    (2006.01)

(52) U.S. Cl.
USPC ........... 73/40.5 R; 73/49.1; 73/49.5; 73/865.8

(58) Field of Classification Search
USPC .................. 73/40, 40.5 R, 49.1, 865.8, 49.5
See application file for complete search history.

(56) References Cited

U.S. PATENT DOCUMENTS

| | | | |
|---|---|---|---|
| 2,975,637 A | 3/1961 | Burdick | |
| 3,786,684 A | 1/1974 | Wiers | |
| 3,837,214 A * | 9/1974 | Guest | 73/40.5 R |
| 4,006,359 A * | 2/1977 | Sullins et al. | 378/60 |
| 4,170,902 A | 10/1979 | Pallan | |
| 4,272,984 A | 6/1981 | Bell | |
| 4,646,787 A | 3/1987 | Rush et al. | |
| 4,888,706 A | 12/1989 | Rush et al. | |
| 5,121,694 A * | 6/1992 | Zollinger | 104/138.2 |
| 5,304,899 A | 4/1994 | Sasaki et al. | |
| 5,770,800 A * | 6/1998 | Jenkins et al. | 73/623 |
| 6,401,525 B1 * | 6/2002 | Jamieson | 73/40.5 R |
| 6,427,602 B1 * | 8/2002 | Hovis et al. | 104/138.1 |
| 7,523,666 B2 * | 4/2009 | Thompson et al. | 73/592 |
| 7,980,136 B2 * | 7/2011 | Ben-Mansour | 73/592 |
| 2010/0064775 A1 | 3/2010 | Ben-Mansour et al. | |
| 2011/0036148 A1 * | 2/2011 | Stubler et al. | 73/40.5 R |
| 2012/0156034 A1 * | 6/2012 | Sabannavar et al. | 416/1 |

FOREIGN PATENT DOCUMENTS

| | | |
|---|---|---|
| CN | 101281801 A | 10/2008 |
| KR | 100646079 B1 | 11/2006 |
| WO | WO2008149092 A1 | 12/2008 |
| WO | WO2010028619 A1 | 3/2010 |

* cited by examiner

*Primary Examiner* — Hezron E Williams
*Assistant Examiner* — Hoang Nguyen
(74) *Attorney, Agent, or Firm* — Richard C. Litman

(57) ABSTRACT

The dual submarine leak detection system provides for controllable in-pipe leak detection. The dual submarine leak detection system includes first and second submarines joined to one another by a tether. Each of the submarines includes a housing and at least one leak detector mounted thereon. A communication transceiver is mounted in the housing for remotely communicating the leak condition and a location of the leak condition, as well as receiving control and communication signals. Each submarine further includes at least one selectively retractable leg mounted on the housing and selectively extending therefrom, and a motor mounted within the housing for driving a propeller to propel the submarine through a fluid-filled pipe. A control system further allows for controllable or programmable steering of the submarine through the fluid-filled pipe and any pipe joints associated therewith.

9 Claims, 6 Drawing Sheets

DUAL SUBMARINE LEAK DETECTION SYSTEM

BACKGROUND OF THE INVENTION

1. Field of the Invention

The present invention relates generally to in-pipe leak inspection, and particularly to a pair of leak detecting submarines that are secured together by a communication and power tether.

2. Description of the Related Art

The problem of water leakage from water pipelines causes clean water loss, energy loss and a major increase in water contamination with hazardous chemicals and metals. Water leakage can reach 50% of the water transported across the water distribution network. It is reported that 30% of the water transported across the Kingdom of Saudi Arabia (KSA) is lost through leakage. These losses are very high and do amount to millions of dollars. Furthermore, the problem of leakage implies penetration of hazardous contaminants into the water distribution system. It has been reported by a group of medical doctors from the department of Oncology, King Faisal Specialist Hospital, Riyadh, Saudi Arabia; that water contamination causing esophageal cancer at Qassim region (KSA) constitutes a major health problem. Furthermore water leaks cause major infrastructure problems by undermining ground stability and, in the process damaging roads and buildings.

A great deal of research work and technology developments have been accomplished in the last two decades to detect water leaks in water distribution networks. Leak detection devices include acoustic leak detection, leak noise correlators, surface listening devices, ground penetrating radar detection methods, and chemical tracing methods as well as X-Ray and infrared radiation methods. In a recent study, the use of leak noise correlators proved unreliable and costly in addition to being time consuming. The use of electronic sound detectors proved more reliable and cost effective. The detectors were placed manually as close as possible to the pipelines.

Recently, a free-swimming leak detection system has been developed to overcome many shortcomings of the acoustic leak detection devices and systems available in the market. The free-swimming leak detector follows the flow of the water and takes advantage of being inside the pipe to clearly detect leaks. The information is stored inside a microprocessor and then downloaded once the detector is extracted from the pipeline. However the motion of this free-swimming leak detection system cannot be controlled by the user and is generally limited by both the shape and dimensions of the pipe, and also by the current flowing through the pipe. Due to the wide variation within pipelines and fluid currents therein, maneuverability and control is desirable in such a free-swimming leak detector.

Further, conventional pipe inspection units, such as pipe inspection gages (PIGs) or present free-swimming robots, require a significant flow velocity within the pipe for propulsion. Thus, in stagnant fluid, or when movement against a current is required, such systems become useless.

Thus, a dual submarine leak detection system solving the aforementioned problems is desired.

SUMMARY OF THE INVENTION

The dual submarine leak detection system provides for controllable in-pipe leak detection. The dual submarine leak detection system includes first and second submarines joined to one another by a tether. Each of the submarines includes a housing and at least one leak detector mounted thereon. An on-board control system, including electronic control circuitry, receives sensory input from the at least one leak detector and is capable of determining a leak condition in the immediate environment of the submarine. A communication transceiver is mounted in the housing for remotely communicating the leak condition and the location of the leak condition, as well as receiving control and communication signals.

Each submarine further includes at least one selectively retractable leg mounted on the housing that selectively extends therefrom, and a motor mounted within the housing for driving a propeller to propel the submarine through a fluid-filled pipe. The control system further allows for controllable or programmable steering of the submarine through the fluid-filled pipe and any pipe joints associated therewith.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
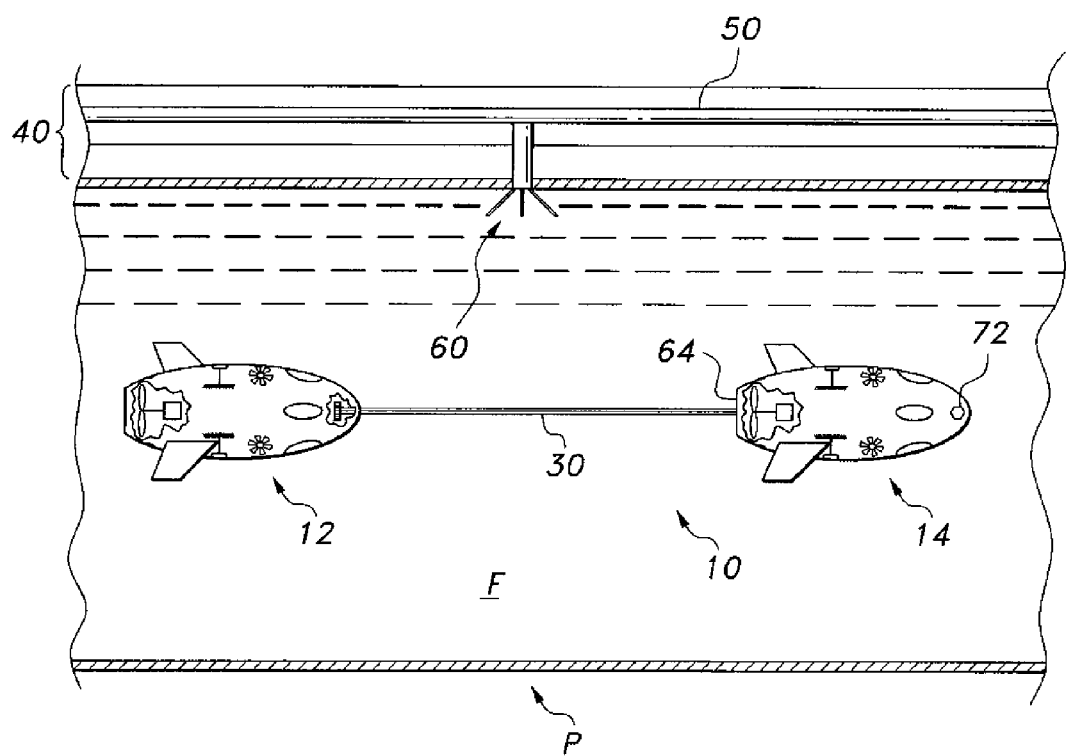
FIG. 1 is a diagrammatic environmental elevation view of a dual submarine leak detection system according to the present invention.
Figure 3:
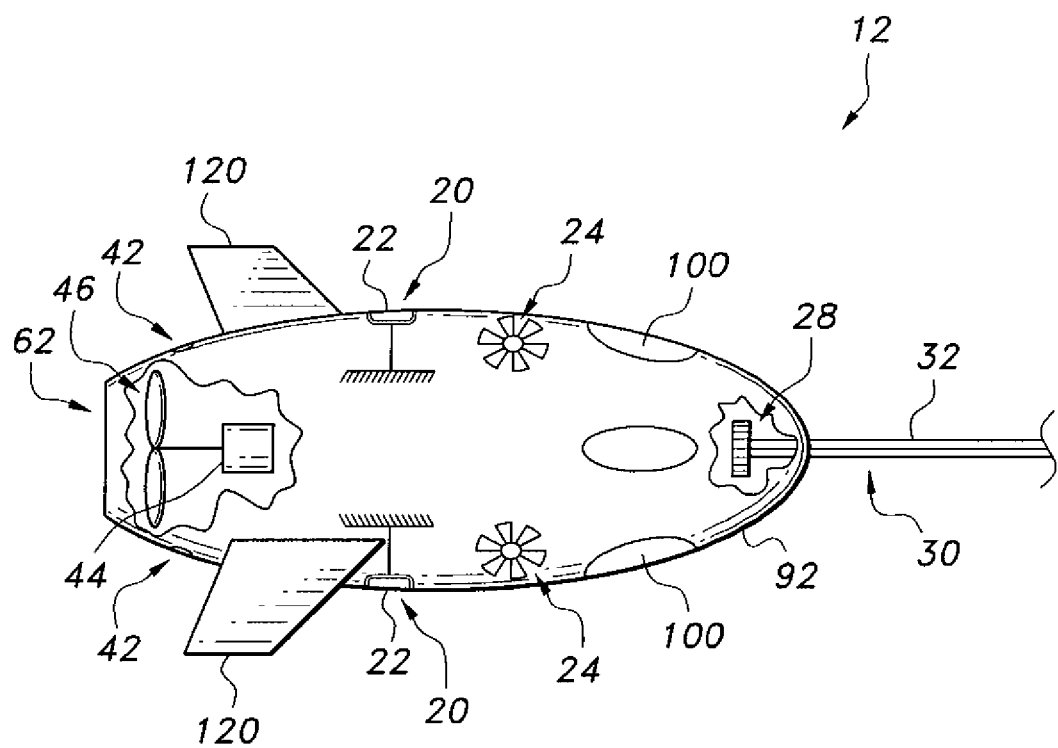
FIG. 3 is a diagrammatic side view of one of the submarines of the dual submarine leak detection system according to the present invention, shown with the housing broken away to show details thereof.

As best shown in FIG. 1, the dual submarine leak detection system 10 provides for controllable in-pipe leak detection. The dual submarine leak detection system 10 includes first and second submarines 12, 14 joined to one another by a tether 30. FIG. 3 illustrates the first submarine 12 in detail. It should be understood that the second submarine 14 preferably includes identical components. As shown in FIG. 3, the first submarine 12 includes a housing 92 with at least one leak detector 100 mounted thereon. The at least one leak detector 100 may be any suitable type of leak detector, such as an ultrasonic leak detector, an acoustic leak detector, a piezoelectric leak detector or the like. In the Figures, a plurality of such leak detectors 100 are shown as being circumferentially arrayed about the front end of each submarine. It should be understood that the number, type and positioning of the leak detectors may be varied, dependent upon the particular environment in which system 10 is deployed.

The tether 30 preferably includes a flexible, outer tether housing or cladding for covering and protecting a cable 32.

Figure 4:
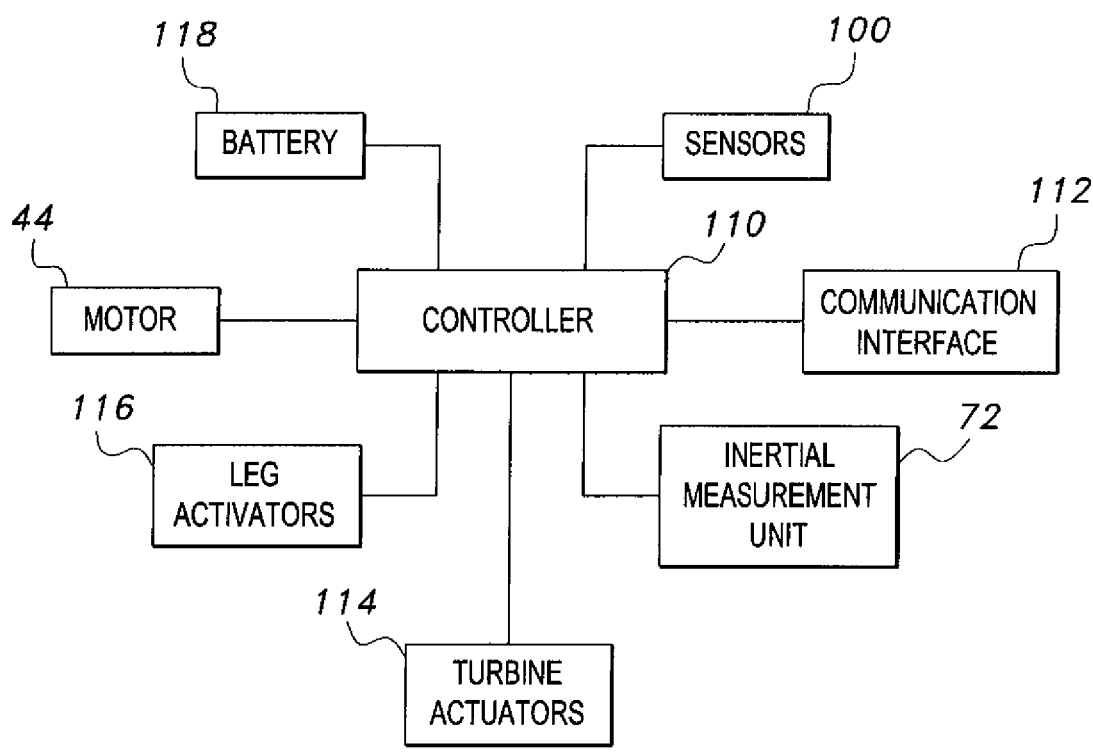
FIG. 4 is a block diagram showing on-board system components of each submarine of the dual submarine leak detection system according to the present invention.

The cable 32 allows communication and control signals to be transmitted and received by and between the first and second submarines 12, 14. A winch 28, pulley, winding drum or the like is mounted on the housing 92 of at least one of the submarines, allowing the length of tether 30 extending between the first and second submarines 12, 14 to be controlled either by an external user or by an on-board control system, as will be described in greater detail below. Further, as illustrated in FIG. 4, each submarine preferably includes at least one electrical storage battery 118, and power may be transmitted and/or received through the cable 32, allowing one submarine to send a recharging current to the other when needed.

The first and second submarines 12, 14 are preferably neutrally buoyant with respect to the fluid F within pipe P. They may be manufactured for passage through a specific type of fluid at a specific pressure or may have variable buoyancy through the use of ballast tanks or the like, as is conventionally known in the art of submarines.

An on-board control system 110, including electronic control circuitry, as will be described in greater detail below, receives sensory input from the at least one leak detector 100 and is capable of determining a leak condition in the immediate environment of the submarine. A communication interface 112, which preferably provides both wired and wireless transceivers, is further mounted in the housing for remotely communicating the leak condition and the location of the leak condition, as well as receiving control and communication signals.

Figure 2:
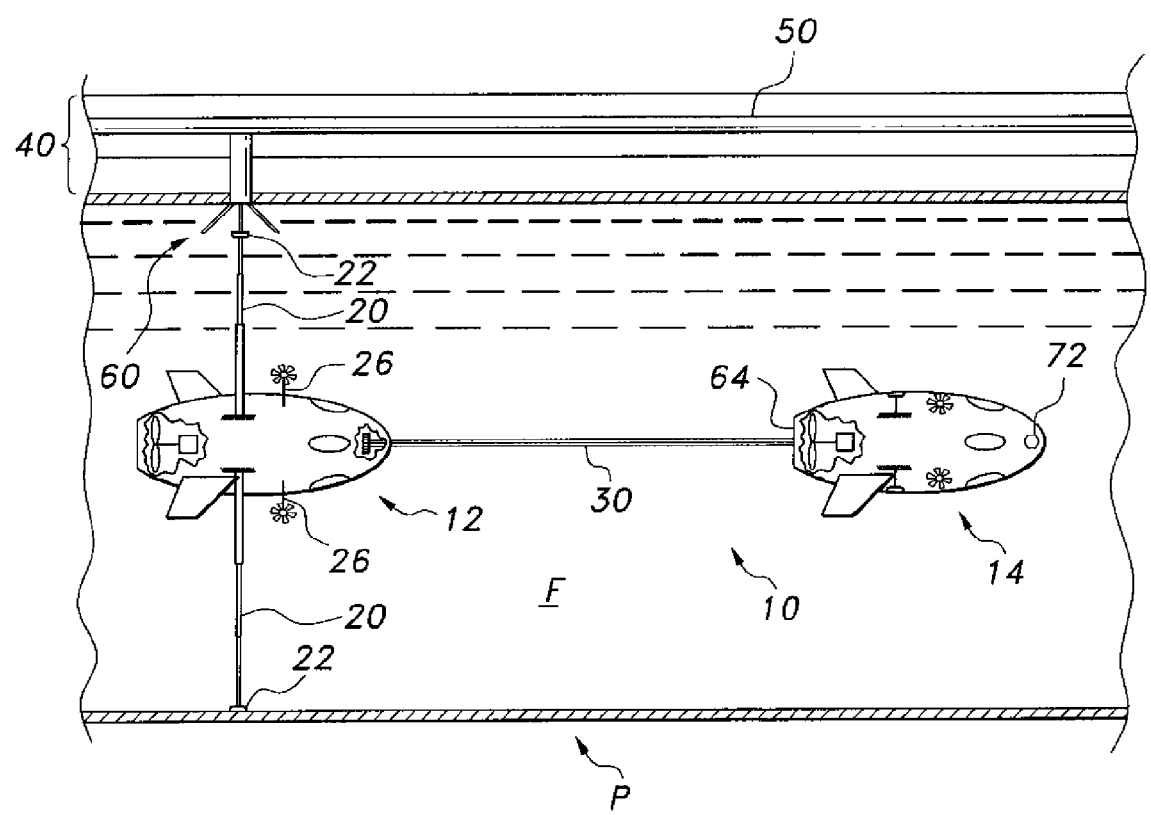
FIG. 2 is a diagrammatic environmental elevation view of the dual submarine leak detection system of FIG. 1, showing one of the submarines with a pair of legs deployed.

As best shown in FIG. 2, each submarine further includes at least one selectively retractable leg 20 mounted on the housing 92 that selectively extends therefrom. Preferably, at least a pair of retractable legs 20 are provided, each retractable leg 20 having an engaging end 22. One engaging end 22 selectively and releasably frictionally engages an interior surface of the pipe P for selectively and controllably anchoring the submarine in place with respect to the pipe P. In the example of FIG. 2, the first submarine 12 is shown as engaging the interior surface of a pipe P, and the second submarine 14 is also anchored in place via its connection with the first submarine 12 through the tether 30. The other engaging end 22 is selectively and releasably linked with a power and communication hub 60 mounted within the fluid-filled pipe P. During travel through the pipe P, the legs 20 are preferably collapsed within the housing 92 in order to reduce drag forces caused by passage through fluid F within the pipe P.

The hub 60 may be any suitable type of data transfer hub, such as an Ethernet port or the like. Interconnection with the hub 60 further serves to anchor the pair of submarines in place. It should be noted that a fluid-driven turbine 24 (to be described in detail below) is preferably deployed while the anchoring legs 20 are extended, allowing recharging power to be generated by the flow of fluid F through the pipe P.

A line extending within the retractable leg 20 interconnects the controller 110 with the power and communication hub 60. This allows the controller 110 to receive commands from an external user through the hub 60, as well as the transmission of leak detection data to the user, and further allows for charging the electrical storage battery 118 from an external power supply. As shown, a conduit 40 is preferably mounted external to the pipe P, extending along its length. The conduit 40 houses a communication and power cable 50, which is linked to the hub 60.

Further, each submarine preferably includes at least one fluid-driven turbine 24 mounted on an exterior face of the housing 92 for generating electrical power as the respective submarine passes through the fluid F within the pipe F. Preferably, the fluid-driven turbine 24 is mounted on a retractable support 26, allowing the turbine 24 to be selectively and controllably deployed or stowed. The fluid-driven turbine 24 is in electrical communication with the storage battery 118 for selective recharging thereof.

A motor 44 is mounted within the housing 92 for driving a drive shaft to rotate, with the drive shaft having a propeller 46 mounted thereon. The motor 44 is powered by the electrical storage battery 118 and is selectively controlled by the controller 110 in order to controllably and/or programmably propel the submarine through the fluid-filled pipe P. As shown in FIG. 3, the rear end of housing 92 is open, allowing the propeller to expel water therethrough to propel the submarine. Vents 42 are formed through the housing 92 for fluid intake. It should be understood that the motor 44, under control of the controller 110, may selectively drive the propeller 46 at any desired speed, or may selectively be driven in reverse, allowing the system 10 to reverse direction within the pipe P.

Figure 6:
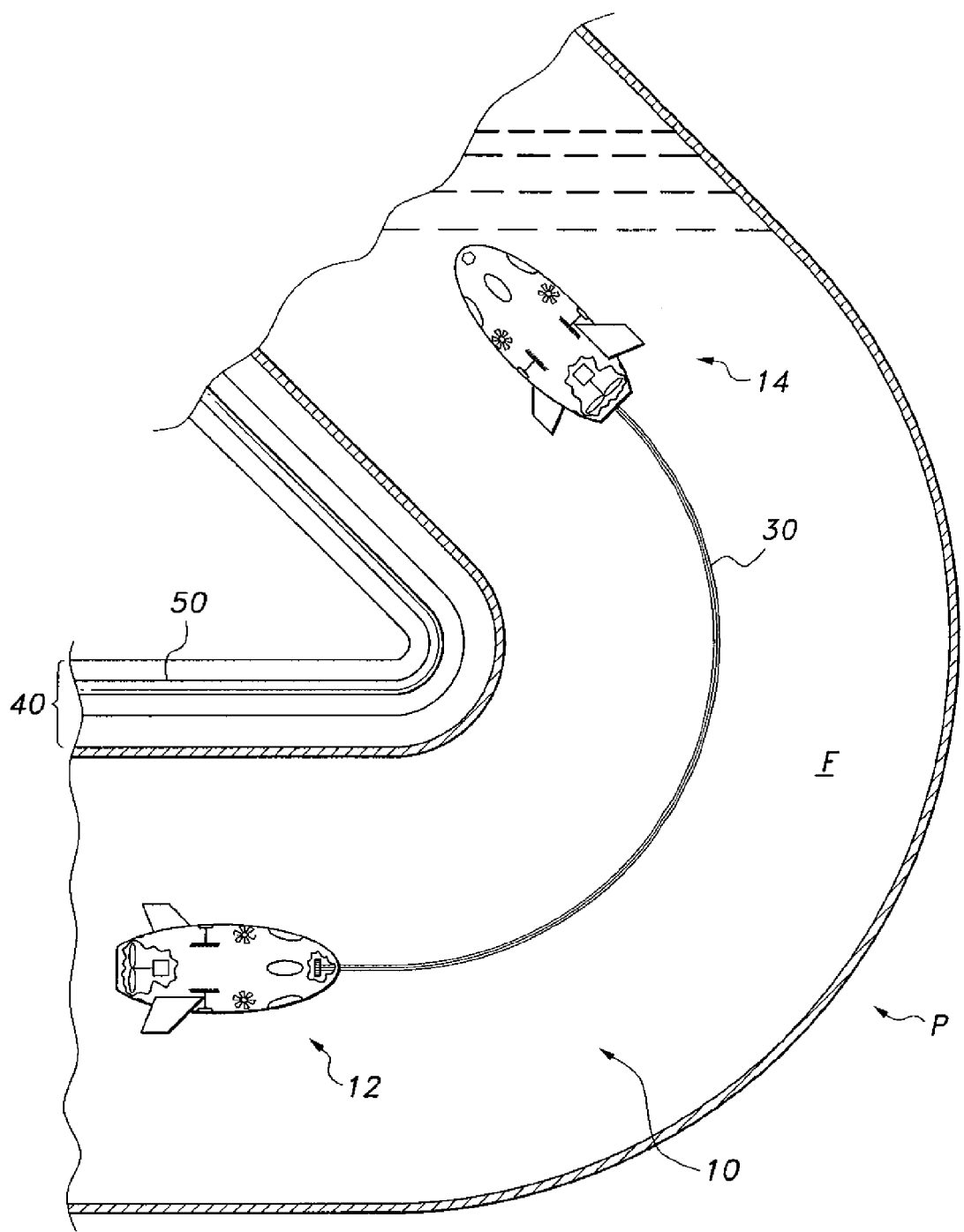
FIG. 6 is a diagrammatic environmental elevation view in section showing the dual submarine leak detection system of FIG. 1 in use within a sharply bent pipeline.

As shown in FIG. 1, an open frame 64, formed from mesh or the like, may cover the open rear end of second submarine 14, the tether 30 being secured to the open frame 64. FIG. 6 illustrates the submarines 12, 14 navigating a relatively sharp turn in the pipe P. The flexibility of the tether 30 and the use of a pair of submarines, as opposed to a single, longer probe, allows for easy navigation through such turns. Preferably, the tether 30 extends at least several pipe diameters between submarines 12, 14, allowing easy navigation of such turns, and further ensuring that turbulence created by the leading submarine 14 does not interfere with the leak detectors 100 on the following submarine 12. Propulsion and wake noise generated by one submarine may interfere with acoustic, temperature and pressure measurement made by the other submarine. Thus, a sufficient distance between the submarines is desirable.

As shown in FIG. 4, the controller 110 is in communication with the at least one leak detector 100 and any additional sensors mounted on the submarine for receiving leak detection signals therefrom. An inertial measurement unit 72 may further be mounted on housing 92 for providing navigational control signals to the controller 110. The communication interface 112, which preferably includes both wired and wireless transceivers, is in communication with the controller 110, allowing the controller 110 to transmit leak detection signals wirelessly to the user and/or through the hub 60. The interface 112 further allows the controller to receive control and command signals from the user, either wirelessly or through the hub 60, and to transmit and receive control signals to the other submarine.

The retractable legs 20 and the retractable mount 26 of the turbine 24 may be driven to deploy and retract through the use of any suitable drive systems, such as linear actuators, hydraulic or pneumatic actuators, or the like. The respective actuators 116, 114 are in communication with the controller 110. The controller 110 provides the command and actuation signals thereto. The controller 110 is further in communication with the motor 44, allowing the controller to selectively actuate and control propulsion of the submarine. Preferably, the controller 110 further allows for controllable or programmable steering of the submarine through the fluid-filled pipe P and any pipe joints associated therewith through control of movable fins 120 or the like. Any suitable drivers are actuators may be linked with the movable fins 120 for controlling the attitude and stability of the submarines 12, 14 as they travel through pipe P.

Figure 5:
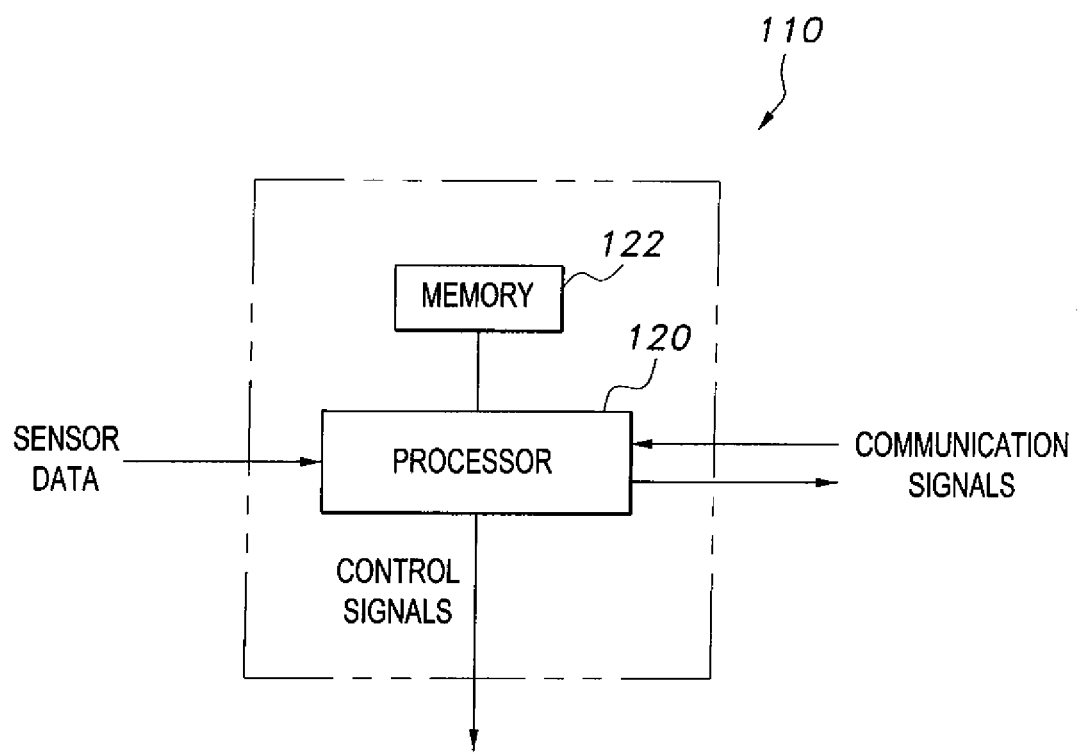
FIG. 5 is a block diagram showing system components of a controller of each submarine of the dual submarine leak detection system of FIG. 1.

It should be understood that any necessary calculations or processing may be performed by any suitable computer system, such as that diagrammatically shown in FIG. 5. The controller 110 receives and sends data through a communication interface 112, and this data may be stored in memory 122, which may be any suitable type of computer readable and programmable memory. Calculations are performed by a processor 120, which may be any suitable type of computer processor.

The processor 120 may be associated with, or incorporated into, any suitable type of computing device, for example, a personal computer or a programmable logic controller. The processor 120, the memory 122, and any associated computer readable recording media are in communication with one another by any suitable type of data bus, as is well known in the art. Although the pair of submarines 12, 14 may be manually controlled through reception of wireless commands, the system 10 may also act autonomously, following control programming stored within memory 122.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 122, or in place of memory 122, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

In order to reduce power and computational needs, it should be understood that a single control system and a single power system may be provided in only one of submarines 12, 14, the other submarine receiving command signals and power through the tether 30. Additionally, as noted above, propulsion and wake noise generated by one submarine may interfere with acoustic, temperature and pressure measurement made by the other submarine. Thus, in use, when one of submarines 12, 14 senses a potential leak site, it sends a control command to the other submarine to cease motion relative to the pipe P through deployment of the legs 20. The controller 110 also sends a command signal to turn off the motor 44 in each submarine. The anchoring of both submarines 12, 14 allows the submarine that has sensed a possible leak to re-check and confirm the leak with its propulsion system turned off. Preferably, the submarine performing the check has its legs 20 and turbine 24 collapsed, thus minimizing any possibility of external noise or vibration caused by flowing fluid F. The other submarine anchors both submarines through deployment of its legs 20.

With one submarine firmly anchored through deployment of the legs 20, the other submarine performing the check and confirmation procedure may move through the fluid through winding or unwinding of the tether 30 and/or through the use of minimal driven propulsion. The anchored submarine preferably maintains a distance of several pipe diameters from the sensing submarine so that noise and interference generated by the anchored submarine is minimal. The anchored submarine may deploy its turbines 24 to take advantage of its minimal functionality, allowing for recharging of its storage battery 118. The distance between the two submarines ensures that the spinning of the turbine 24 within the fluid F will keep turbulence and noise minimal with respect to the leak detection being performed by the sensing submarine. The inertial measurement unit 72 records the location of the suspected and/or confirmed leaks in memory 122.

When the storage batteries 118 need to be recharged, both submarines 12, 14 can anchor themselves to the pipe P through extension of the legs 20, turning off their respective propulsion systems and deploying their turbines 24 to generate electrical power from the passing flow of fluid F. When there is little or no flow in the pipe P, the submarines 12, 14 can recharge by latching ends 22 to the power and communication hubs 60. Further, when connected to these hubs 60, the submarines 12, 14 can upload their data (stored in memory 122) to an external control center through the communication and power cable 50, housed within protective conduit 40. For this purpose, only one submarine needs to be connected to the hub 60, while the other submarine may receive power and communicate through the tether 30 (as shown in FIG. 2).

It should be understood that additional devices for connection of the ends 22 with the hubs 60 may be utilized, such as conventional arrester cables or the like, which would be attached to the inner surface of the pipe P. Preferably, a navigational map of the pipe P is stored within memory 122, providing the submarines 12, 14 with knowledge and control instructions for locating the hubs 60. Prior to reaching a hub 60, the legs 20 begin to deploy, catching an arrester cable or the like, thus slowing and eventually stopping the submarines' movement for connection with the hub 60 (similar to the arrester cables used on aircraft carriers for catching and stopping aircraft).

Preferably, the power and communication hubs 60 are situated at known locations, which are stored in the submarines' memories 122. When one of the submarines docks at one of the hubs 60, the position indicated by the inertial measurement unit 72 can be checked for errors and can be corrected, if necessary. Similarly, if a submarine docks after confirming a leak, thus indicating the nearest hub 60 to the leak, this provides a very strong correlation of leak position estimated by onboard instruments. In the case of a stuck or lost submarine, the hubs 60 also provide the last known location of the submarines 12, 14.

A small fleet of such pairs of submarines 12, 14 can easily survey an entire piping network in a relatively short time. Each pair can intermittently deliver their report, location and status to the external control center via the communication cable 50 associated with the hubs 60, which are placed at convenient locations along the entire piping network, and/or through wireless transmission signals. The external control center can then plan where to send the individual pairs of submarines on missions, such as surveying unexplored network sections, search and location of stuck or disabled submarines, and possibly rescuing or repairing them, re-checking suspected leaks, etc. Alternatively, one of the pairs of submarines in the fleet can latch to a hub 60 for an extended period of time, thus functioning as a local control headquarters for a portion of the fleet or the entire fleet, relying on the power supplied by the hub 60.

It is to be understood that the present invention is not limited to the embodiments described above, but encompasses any and all embodiments within the scope of the following claims.

We claim:

1. A dual submarine leak detection system, comprising:
 first and second submarines, each of the submarines having:
  a housing;
  at least one leak detector mounted on the housing;
  means for determining a leak condition in an immediate environment of the submarine;
  a communication transceiver mounted in the housing for remotely communicating the leak condition and a location of the leak condition;
  a motor mounted within the housing;
  a drive shaft connected to the motor;

a propeller connected to the drive shaft, wherein the combination of motor, drive shaft and propeller being adapted for propelling the submarine through a fluid-filled pipe;

means for steering the submarine through the fluid-filled pipe and pipe joints associated therewith; and at least one retractable leg having an engaging member mounted thereon for releasably linking with a power and communication hub mounted within the fluid-filled pipe;

a tether securing the first and second submarines together, wherein said tether comprises an outer tether housing and a cable disposed therein;

means for transmitting and receiving inter-submarine communication and command signals through the cable; and means for transmitting and receiving power through the cable.

2. The dual submarine leak detection system as recited in claim 1, wherein said means for determining the leak condition comprises electronic control circuitry disposed within said housing.

3. The dual submarine leak detection system as recited in claim 1, wherein each said submarine further comprises an electrical storage battery.

4. The dual submarine leak detection system as recited in claim 3, wherein each said submarine further comprises at least one fluid-driven turbine mounted on an exterior face of said housing for generating electrical power as the respective submarine passes through the fluid-filled pipe.

5. The dual submarine leak detection system as recited in claim 4, wherein the at least one fluid-driven turbine is in electrical communication with the electrical storage battery for the selective recharging thereof.

6. The dual submarine leak detection system as recited in claim 5, wherein the at least one fluid-driven turbine is selectively retractable.

7. The dual submarine leak detection system as recited in claim 1, wherein the at least one retractable leg comprises a pair of retractable legs, one of said retractable legs having a frictional engaging member mounted thereon for frictionally engaging an inner surface of the fluid-filled pipe.

8. The dual submarine leak detection system as recited in claim 1, wherein each said submarine further comprises means for transmitting and receiving communication and control signals from the power and communication hub.

9. The dual submarine leak detection system as recited in claim 8, wherein each said submarine further comprises means for receiving power from the power and communication hub.

* * * * *